United States Patent
Foo et al.

[19]

[11] Patent Number: 5,884,988
[45] Date of Patent: Mar. 23, 1999

[54] TONER-TYPE COMPUTER HOUSING FOR PERIPHERALS

[75] Inventors: Khim Foo, Palo Alto; Steven Furuta, Santa Clara; Thanh Tran; Kenneth Kitlas, both of San Jose, all of Calif.

[73] Assignee: Sun Microsystems, Inc., Mountain View, Calif.

[21] Appl. No.: 889,353

[22] Filed: Jul. 8, 1997

[51] Int. Cl.⁶ .................................................. H05K 5/00
[52] U.S. Cl. ................................. 312/223.2; 312/265.6
[58] Field of Search ..................... 312/204, 213, 312/257.1, 263, 265.5, 265.6, 223.1, 223.2; 361/684, 685, 683

[56] References Cited

U.S. PATENT DOCUMENTS

| | | | |
|---|---|---|---|
| 4,964,017 | 10/1990 | Jindrick et al. | 361/683 |
| 5,397,176 | 3/1995 | Allen et al. | 312/365.6 X |
| 5,447,367 | 9/1995 | Wei | 361/685 X |
| 5,513,068 | 4/1996 | Girard | 361/683 X |
| 5,542,757 | 8/1996 | Chang | 312/223.2 |
| 5,547,272 | 8/1996 | Paterson et al. | 361/683 X |
| 5,568,611 | 10/1996 | Khatri et al. | 361/683 X |

FOREIGN PATENT DOCUMENTS 2255674  11/1992  United Kingdom ................... 361/683

*Primary Examiner*—Jose V. Chen
*Assistant Examiner*—Janet M. Wilkens
*Attorney, Agent, or Firm*—Julian Caplan; Flehr Hohbach Test Albritton & Herbert LLP

[57] ABSTRACT

A "tower"-type computer has a metal frame or chassis enclosed in an ornamental plastic housing. One side of the plastic housing with an attached metal liner is detachable for access to the interior of the chassis. The upper front corner of the chassis is provided with a metallic subframe. The front of the chassis is substantially open in front of this subframe and is formed with ventilation holes below the subframe. A detachable main bezel, divided into three vertically separated sections, covers the front of the chassis. The upper section of the main bezel is substantially open but is provided with ears so that fasteners can connect the ears to the front of the chassis. A peripheral bezel snaps onto this upper section of the main bezel and is provided with three openings which are covered with removable fillers. When a filler is removed, a computer peripheral may be inserted through the peripheral bezel into tracks in a bracket installed in the subframe.

18 Claims, 4 Drawing Sheets

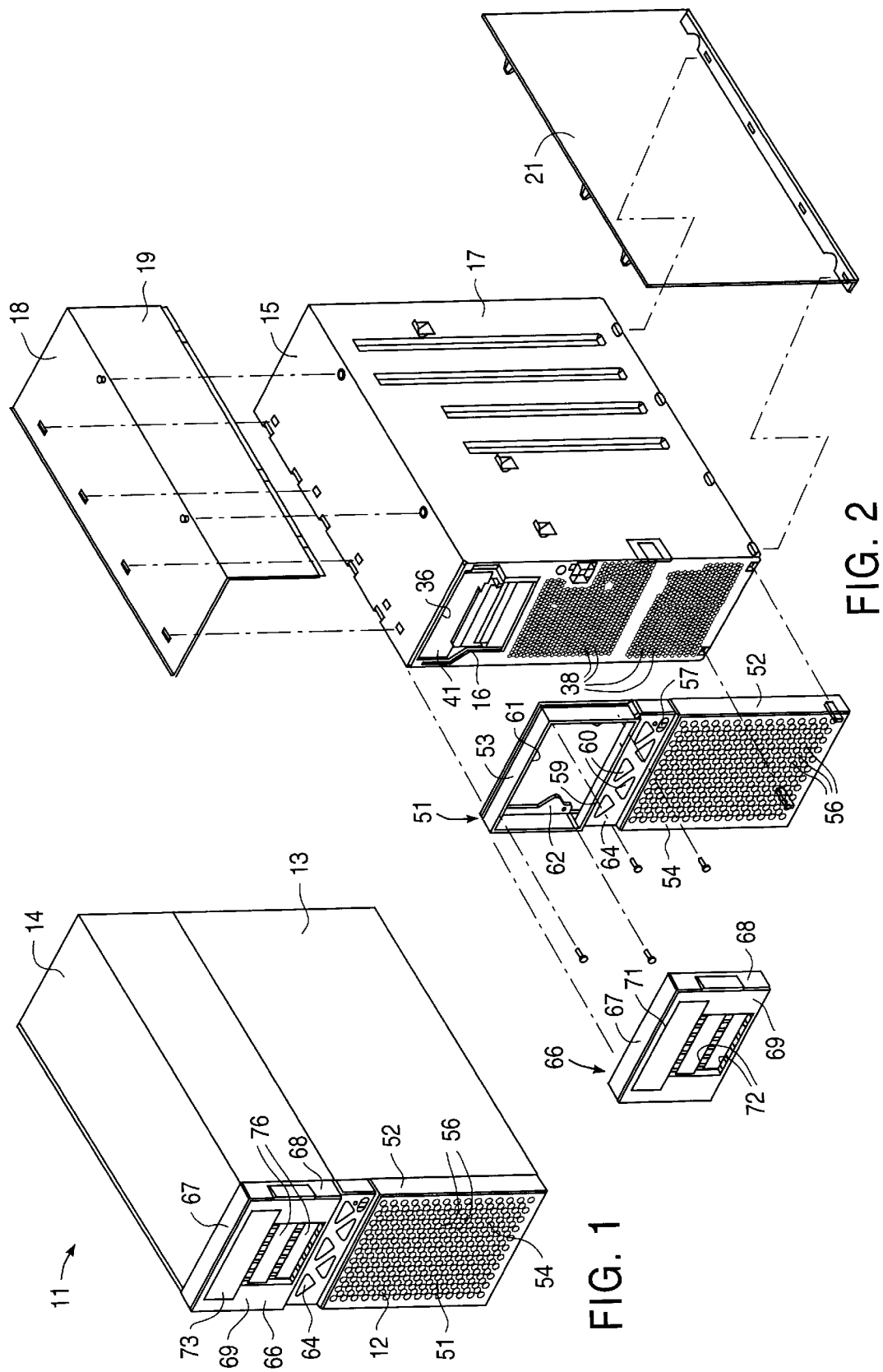

TONER-TYPE COMPUTER HOUSING FOR PERIPHERALS

BACKGROUND OF THE INVENTION

1. Field of the Invention

This invention relates to a new and improved tower-type computer housing for peripherals wherein the front of the computer chassis is formed with apertures covered by a main bezel, the upper part of which is open and is covered by a peripheral bezel formed with apertures for insertion of various peripherals such as a 5¼" disk drive or 3½" floppy disks. The apertures are covered by removable blanks which may be individually removed, the customer having the opportunity to customize the computer by using some of the openings and not others, depending upon needs.

2. Description of Related Art

Tower-type computers are well known in the industry. The present invention provides an ornamental bezel covering the front of the computer chassis having detachable blank covers for openings into which various peripherals may be inserted. Since the needs of customers vary, one customer may use certain peripherals and another different peripherals. The structure of the present invention permits such selection by the customer.

SUMMARY OF THE INVENTION

A tower-type computer is provided, by which is meant that the vertical dimensions of the computer are greater than the horizontal dimensions when viewed from the front. The computer is provided with a metallic chassis which covers the bottom, right side, top, front and back. The chassis is covered on the top, right side and back with a plastic casing of an ornamental character. The plastic left side of the computer is removable for access to the interior and the left side is lined with a metallic liner so that the entire computer is, as far as possible, shielded by the metallic chassis and liner. A metallic subframe is installed in the top of the chassis. The front of the chassis is substantially open in front of the subframe and is formed with ventilation holes below the opening for the subframe.

A detachable front main bezel which fits over the front of the chassis is divided into three vertically separated sections to cover the front of the chassis. The upper section of the main bezel is substantially open but is provided with ears so that the ears may be fastened to corresponding ears in the front of the chassis. A peripheral bezel snaps onto the upper section of the main bezel and is provided with three vertically spaced openings which are covered with detachable fillers or blanks. When a filler is removed, a computer peripheral may be inserted through the peripheral bezel and also through the main bezel into a bracket installed in the subframe.

Versatility in the types of peripherals which may be installed in the computer is desirable since individual customers have preferences. These preferences may be readily accommodated in accordance with the present invention.

A feature of the invention is the fact that the peripheral bezel is easily snapped onto or removed from the main bezel. Once it is removed, the peripherals installed therein are accessible. The blank covers for both 5¼" and 3½" format devices are likewise easily unsnapped from the peripheral bezel.

BRIEF DESCRIPTION OF THE DRAWINGS

The accompanying drawings, which are incorporated in and form a part of this specification, illustrate embodiments of the invention and, together with the description serve to explain the principles of the invention.

FIG. 1 is a perspective view of the exterior of a tower-type computer in accordance with the present invention.

FIG. 2 is an exploded perspective view showing the computer chassis and associated parts.

DESCRIPTION OF THE PREFERRED EMBODIMENT

Figure 3:
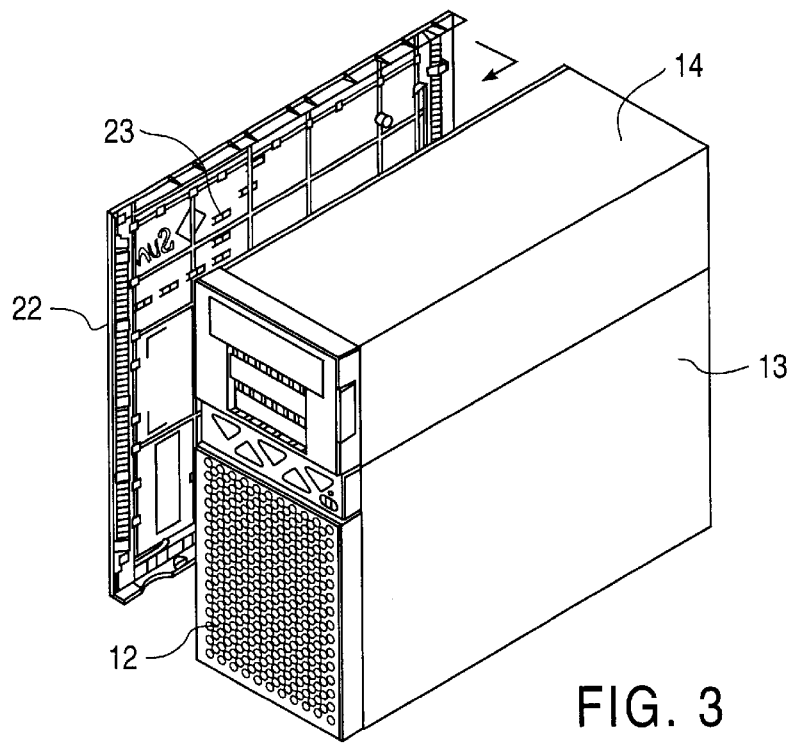
FIG. 3 is a view similar to FIG. 1 with the left side of the casing and its liner separated.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As viewed in FIG. 1 it will be seen that an aesthetic tower-type computer housing 11 is displayed. The front 12 is most frequently viewed by the customer and is extremely ornamental as well as functional. As also viewed in FIG. 1 there is a right side 13 and a top 14. The front sides and top are all formed of plastic and enclose a metallic chassis. The material of construction is electro-galvanized cold roll steel (pre-plated), or other suitable material. Chassis front 16 and chassis right side 17 as well as chassis top 15 are encased in plastic. Angle-shaped plastic top 18 covers top 14 and includes a vertical portion 19 which covers the upper portion of the right side 17 of the chassis. A lower right side plastic cover 21 encloses the lower portion of chassis side 17.

Directing attention to FIG. 3, the removable left side 22 is shown displaced from the housing, exposing the metallic liner 23 on its inside surface. The provision of a metallic chassis which encloses the components of the computer is a requirement for EMC radiation protection. At the same time, the ornamental plastic covering satisfies aesthetic requirements.

Figure 4:
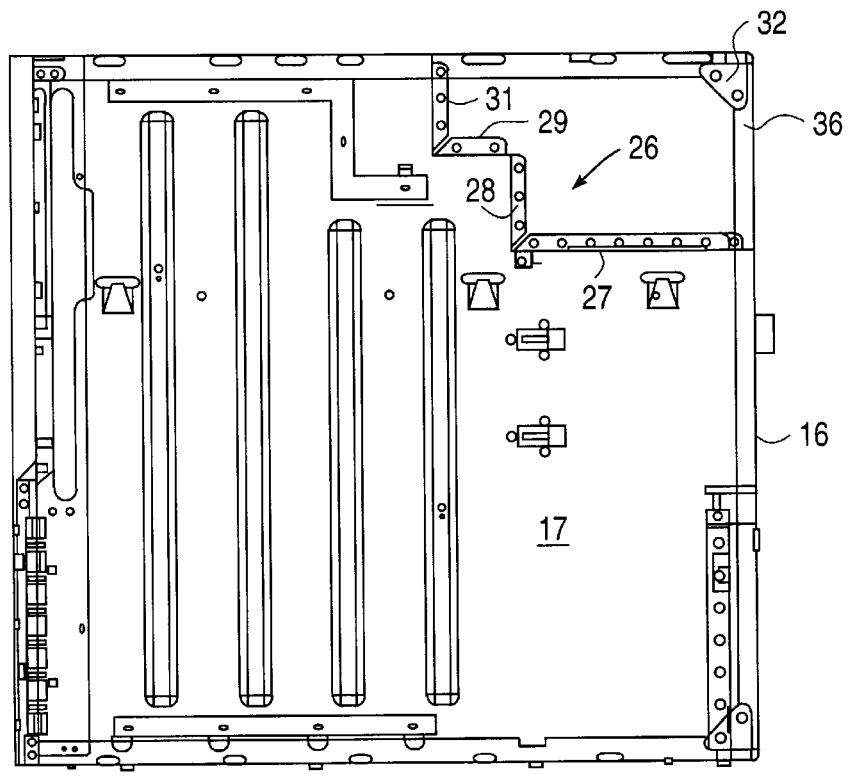
FIG. 4 is a side elevational view of the computer chassis showing installation of the subframe for the peripherals.

FIG. 4 discloses a subframe 26 attached by rivets to chassis right side 17. Thus the enclosure 26 when viewed from the front is at the top. Subframe 26 comprises a horizontal base 27 which fits from the right side 17 to conjunction with liner 23. At the rear of base 27 is a vertical upward stretch 28 which extends approximately half the height of the subframe and terminates in a horizontal ledge 29, from the back end of which extends vertical back 31 which engages the top 14 of the chassis. Corner reinforcement 32 is provided in the upper right corner, as viewed in FIG. 4. The reason for base 27 being less than the total length of the subframe 26 is that the subframe accommodates the drive brackets for peripherals of different lengths and the longer brackets are positioned above the level of ledge 29.

Figure 5:
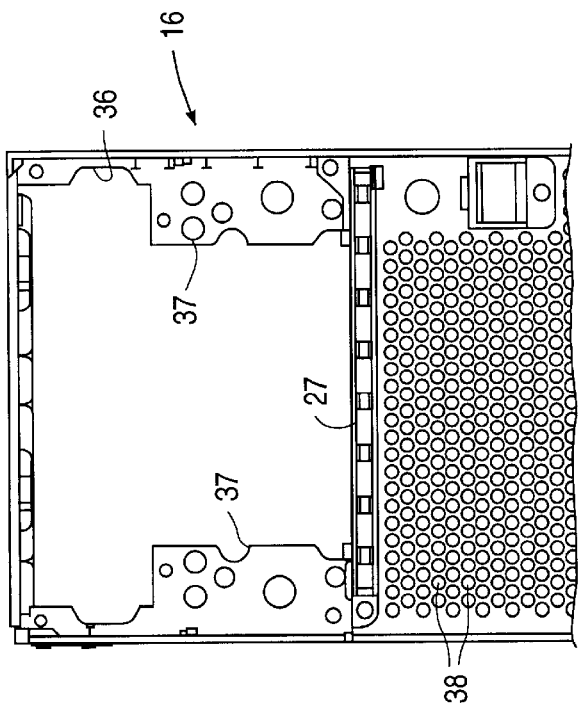
FIG. 5 is an enlarged partial front elevational view of the front of the chassis.
Figure 6:
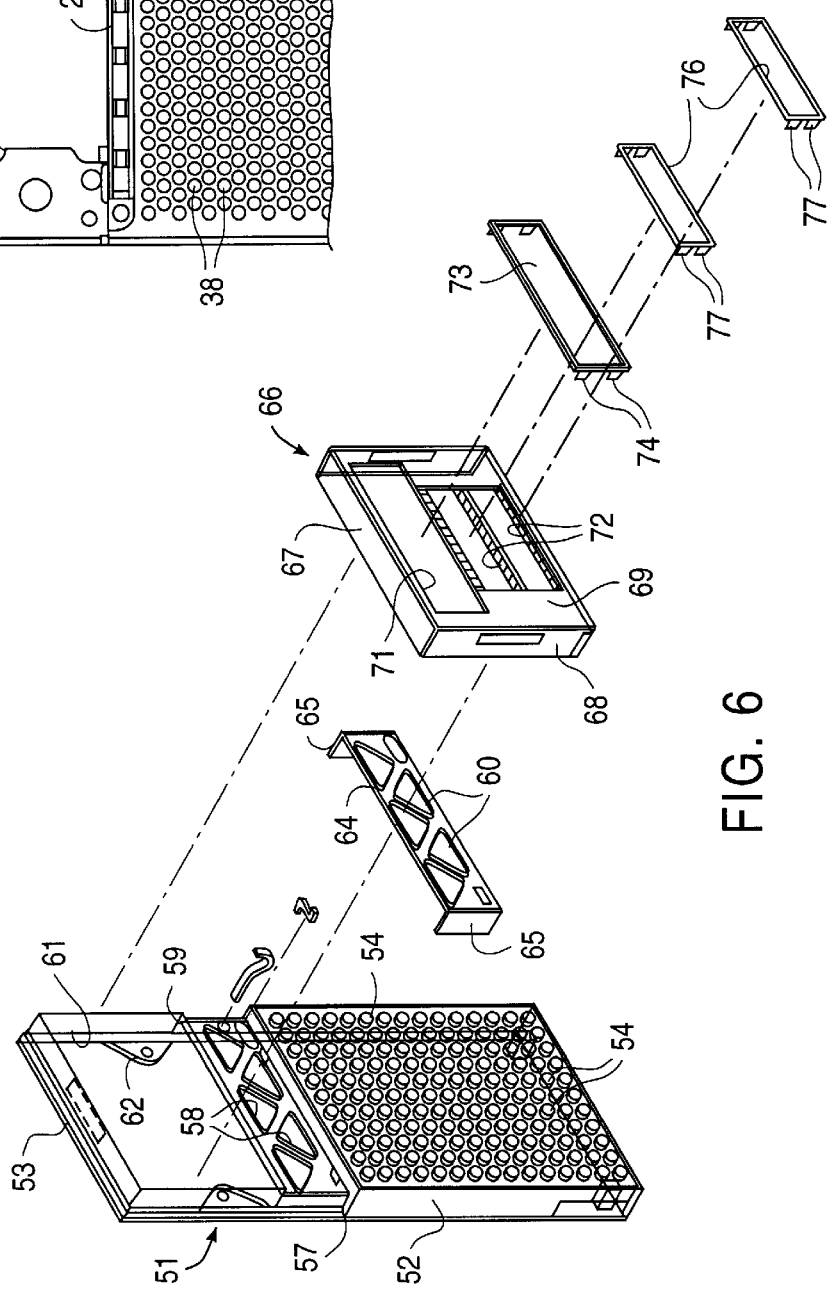
FIG. 6 is an exploded perspective view showing the main bezel and associated parts.

FIG. 5 is an enlarged view of the upper portion of the front 16. There is a top opening 36 having inward extending ears 37 below the level of ledge 29. Ventilating apertures 38 are formed below base 27, all as best shown in FIG. 2.

Figure 7:
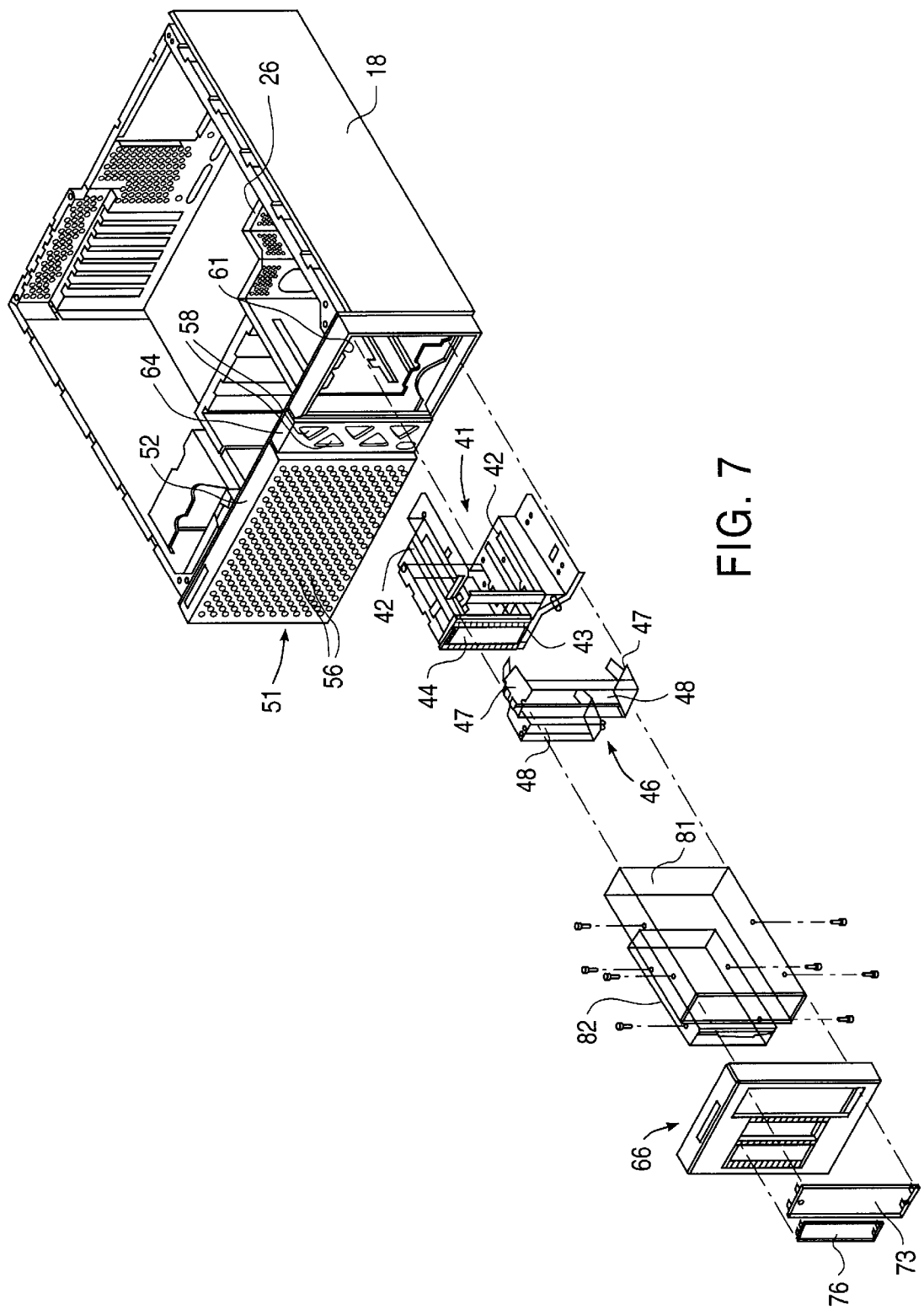
FIG. 7 is an exploded perspective view of the computer with the left side removed and the chassis rotated 90°.

FIG. 7 illustrates a peripheral drive bracket 41 which fits into opening 36 and has sides 42, the right side of which is attached to the side 17 and the left side of which engages the liner 23. Front 43 of bracket 41 is formed with openings 44 to accommodate different sizes of peripherals. A secondary peripheral bracket 46 having sides 47 formed with openings 48 engages peripheral drive bracket 41. Bracket 46 accommodates CDs, tape drives and floppy drives and similar devices. When no such devices are used, it may be removed and the opening in bracket 41 sealed, as by electrically conductive plastic foam (not shown, but well known in the industry).

It will be understood that the brackets 41 and 46 are shaped to receive and to hold peripherals in alignment. Thus the larger opening 44 accommodates a 5¼" format tape or CD drive while the smaller openings accommodate 3½" format floppy disk drives or PCMCIA devices or whatever other conventional sized peripherals the owner of the computer requires. It is held to computer housing 11 with two captive screws. The rear of each bracket may have a socket to mate with a plug on the inner end of the peripheral or the socket may be adhered to the subframe 26.

Front 16 is concealed by a plastic main bezel 51 having sides 52 which fit over the front edges of sides 17 and 22, a top 53 which fits over the front edge of top 15 and a front 54. The lower portion of front 54 is formed with ventilation holes 56 which register with ventilation holes 38 in chassis front 16. A horizontal step 57 extends slightly rearwardly of the lower portion of front 54 and front 54 is then formed with an intermediate vertical portion having triangular openings 58. An upper step 59 extends slightly rearwardly and thereabove the bezel 51 is formed with an opening 61 into which extend lateral ears 62 which are positioned to be fastened to the ears 37 of the chassis.

A plastic dress panel 64 formed with apertures 63 complementary to the apertures 58 of the main bezel and having inner sides 65 snaps over the middle portion of the main bezel 51, the holes 60 in the dress cover 64 matching the holes 58.

Plastic peripheral bezel 66 is formed with a top 67 which fits over top 53, sides 68 which frictionally engage and snap onto the upper sides 52 and a front 69 which fits over the opening 61. Peripheral bezel 66 is formed with a top opening 71 and two lower openings 72, it being understood that the number and sequence of the openings 71, 72 is subject to variation. Top opening 71 may be closed by a detachable plastic top filler or blank 73 formed with rearward extending hooks 74 which snap behind the margins of opening 71. A pair of lower fillers 76 which have hooks 77 on either side snap into the margins of openings 72.

As has been explained, each customer has individual requirements and may or may not require CD or tape drives 81 or floppy drives 82. The conventional disk drive 81 has a 5¼" "format" to receive a cartridge holding a 5¼" tape or CD drive. Similarly the 3½" format floppy drive 82 is shaped to accommodate a 3½" floppy disk. PCMCIA drives are also commonly used in a format to fit the opening for a 3½" floppy drive. The user removes the blanks or filler 73 and 76 depending upon what peripherals are to be installed. The peripheral may then be inserted through openings 71 or 72 and thence into device brackets 41 or 46 which are installed in the subframe 26. One of the features of the invention is the fact that the peripherals may be installed through the front rather than through the side or back as in most tower-type computers, yet the ornamental appearance of the front of the computer is enhanced rather than impaired. If the requirements of the user change, the blanks 76 and 73 may be reinstalled, depending upon the particular openings which are required.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A bezel for detachable installation on the front face of a tower-type computer chassis comprising a main bezel having first sides to engage the sides of the chassis, a top to engage the top of the chassis, and a first front, said first front being formed with an opening, and attachment means extending into said opening for receiving fastening means to detachably engage the chassis, and a detachable peripheral bezel to engage said main bezel and cover said opening, said peripheral bezel having second sides to fit over said first sides laterally of said opening and a second front, said second front being formed with an aperture shaped to receive a peripheral.

2. A bezel according to claim 1, which further comprises a detachable blank to block said aperture.

3. A bezel according to claim 1 in which said main bezel is formed with a lower first section, an intermediate second section and a third section containing said opening.

4. A bezel according to claim 3 which said third section is uppermost of said sections and in which said intermediate second section is displaced inwardly of said lower first section.

5. A bezel according to claim 4 in which said lower first and intermediate second sections are formed with first and intermediate ventilation holes respectively and which further comprises a dress panel formed with second apertures detachably attached to said intermediate section.

6. A bezel according to claim 1 in which said second front is formed with a second aperture of a size different from said first-mentioned aperture and which further comprises a detachable blank to block said second aperture.

7. A bezel according to claim 6 in which said first-mentioned aperture is larger than said second aperture.

8. A bezel according to claim 7 in which said first-mentioned aperture is shaped for passage of a 5¼ inch format peripheral and said second aperture is shaped for pasage of a 3½ inch format peripheral.

9. A bezel according to claim 1 in which said peripheral bezel has a top to fit over the top of said main bezel.

10. A bezel according to claim 1 and a chassis front face formed with a chassis opening underlying said opening and having second attachment means underlying said first-mentioned attachment means.

11. A bezel according to claim 10 in which said first-mentioned attachment means comprises at least one first ear on said main bezel extending laterally into said first-mentioned opening and said second attachment means comprises at least one second ear extending laterally into said chassis opening.

12. In combination, a tower-type computer housing having a chassis having chassis sides, a top and a front face formed with ventilation holes and a chassis opening, a subframe behind said chassis opening, at least one peripheral bracket in said subframe shaped to receive a peripheral, a main bezel having first bezel sides to engage said chassis sides, a bezel top to engage said chassis top, and a first bezel front, said first bezel front being formed with an opening, and attachment means extending into said bezel front opening for receiving fastening means to detachably engage said chassis, and a detachable peripheral bezel to engage said main bezel and cover said bezel front opening, said peripheral bezel having second sides to fit over said first bezel sides laterally of said bezel front opening and a second bezel front, said second bezel front being formed with an aperture shaped to receive a peripheral.

13. The combination of claim 12 in which said first bezel front is formed with second ventilation holes vertically spaced from said bezel front opening, said second ventilation holes communicating with said first-mentioned ventilation holes.

14. The combination of claim 12 in which said second bezel front is formed with a second aperture of a size different from said first-mentioned aperture and which further comprises a detachable blank to block said second aperture.

15. The combination of claim 14 in which said apertures are of different sizes.

16. The combination of claim 14 in which said first-mentioned bezel aperture is shaped for passage of a 5¼ inch format peripheral and said second aperture is shaped for passage of a 3½ inch format peripheral.

17. The combination of claim 12 in which said chassis front face opening underlies said bezel front opening, second attachment means underlies said first-mentioned attachment means, and fastening means attach said first-mentioned and second attachment means together.

18. The combination of claim 17 in which said first-mentioned attachment means comprises at least one first ear on said main bezel extending laterally into said bezel front opening and said second attachment means comprises at least one second ear extending laterally into said chassis front face opening.

* * * * *

UNITED STATES PATENT AND TRADEMARK OFFICE
CERTIFICATE OF CORRECTION

PATENT NO. : 5,884,988
DATED : March 23, 1999
INVENTOR(S) : Khim Foo, Steven Furuta, Thanh Tran and Kenneth Kitlas It is certified that error appears in the above-identified patent and that said Letters Patent is hereby corrected as shown below:

Title page, item [54] and Column 1, lines 1-2

Please change the title to read:

TOWER-TYPE COMPUTER HOUSING FOR PERIPHERALS.

Signed and Sealed this

Sixth Day of June, 2000

*Attest:*

Q. TODD DICKINSON

*Attesting Officer*        *Director of Patents and Trademarks*